Aug. 14, 1928.  
E. W. MILLER  
1,680,562  
GEAR GENERATING MACHINE  
Original Filed Aug. 2, 1922  5 Sheets-Sheet 1

Aug. 14, 1928.

E. W. MILLER

1,680,562

GEAR GENERATING MACHINE

Original Filed Aug. 2, 1922    5 Sheets-Sheet 2

INVENTOR
Edward W. Miller.
By Wright, Brown, Quinby & Hay
Attys.

Aug. 14, 1928.

E. W. MILLER 1,680,562

GEAR GENERATING MACHINE

Original Filed Aug. 2, 1922   5 Sheets-Sheet 4

INVENTOR
Edward W. Miller.
By Wright, Brown, Quinby Thay
Attys.

Fig. 11.

Patented Aug. 14, 1928.

1,680,562

UNITED STATES PATENT OFFICE.

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR-GENERATING MACHINE.

Application filed August 2, 1922, Serial No. 579,140. Renewed May 16, 1928.

The present invention relates to means for generating gears, and its main object is to provide a machine which is simple in construction and inexpensive to maintain in operative condition, and by which gears can be rapidly cut from blanks with generation, according to correct principles, of approximately accurate tooth forms. More particularly the present invention is designed for performing a roughing out operation on gears to be later finished in shaping machines by which the greatest possible mathematical accuracy is obtained; but I do not limit the invention to the use for roughing only, since for some purposes gears with the approximation to absolute accuracy possible by the use of this machine, may be put into use without further finishing action.

The principle on which the machine operates is that the cutting tool comprises cutting edges in the form of rack teeth which are revolved about an axis parallel with the pitch line of the rack teeth, while the blank being cut is caused to travel in a path parallel to such axis, and at the same time to be rotated about its own axis with the angular velocity of a gear rolling in mesh with a rack counterpart of the cutter. This action generates tooth curves in the work which are correctly conjugate to the tooth faces of the cutter. The work piece, being a spur gear designed to mesh with other spur gears, is inaccurate, if at all, only to the extent that the arc through which the cutters travel in passing from one end of the work piece to the other deviates from the chord of such arc. This deviation is made a minimum by revolving the cutter elements in an orbit of large radius, which is many times greater than the thickness of the work, so that the inaccuracy from this cause is slight at the most, and is in any case capable of being corrected with a minimum of effort in a shaping or grinding machine. In some cases, particularly in that of gears of slight thickness, the inaccuracy may be inappreciable and the gears may be brought to final size and width of tooth by my machine ready for operative use without further finishing.

Further characteristics of the invention and objects attained thereby are explained in the following specification in connection with the description in detail of a specific machine embodying the invention which is illustrated in the drawings provided herewith. In said drawings.

Like reference characters indicate the same parts in all the figures wherever they occur.

The cutting tool is preferably a multiple cutting tool consisting of a cylindrical head 10 carrying a large number of inserted cutters or cutting elements 11, in the interest of rapid production; although, so far as the principle is concerned, a single such cutting element is sufficient. These elements are bars having teeth 12, the cutting edges $a$, $b$, $c$, $d$ of which (Fig. 8) forms the outlines of rack teeth and the sides of which are backed off from the cutting edges in a manner common with cutting tools so as to clear the work. These rack-shaped cutter bars are mounted in external grooves 13 in the cutter head, such grooves being of equal depth and parallel to the axis of the cutter head, so that all of the cutter teeth are at the same distance from the axis of the head and the pitch lines of the several racks are parallel to said axis and they are there secured by screws 14. Then, with rotation of the cutter head, the cutting edges a, b, c, d travel in orbits the profiles of which (intersections with planes radial to the cutter axis) have the form of the base rack to which the gears produced in the machine are to be made conjugate. Of course, also, the corresponding teeth in the several cutter bars register with one another in the same zone perpendicular to the axis of the cutter head. Provided, however, that the condition is maintained of teeth equally distant from the axis and properly spaced longitudinally of the axis, and that the orbits in which the cutting edges travel have the desired profiles, the cutter may be otherwise made than according to the specific combination here illustrated.

Figures 2, 9, 10:
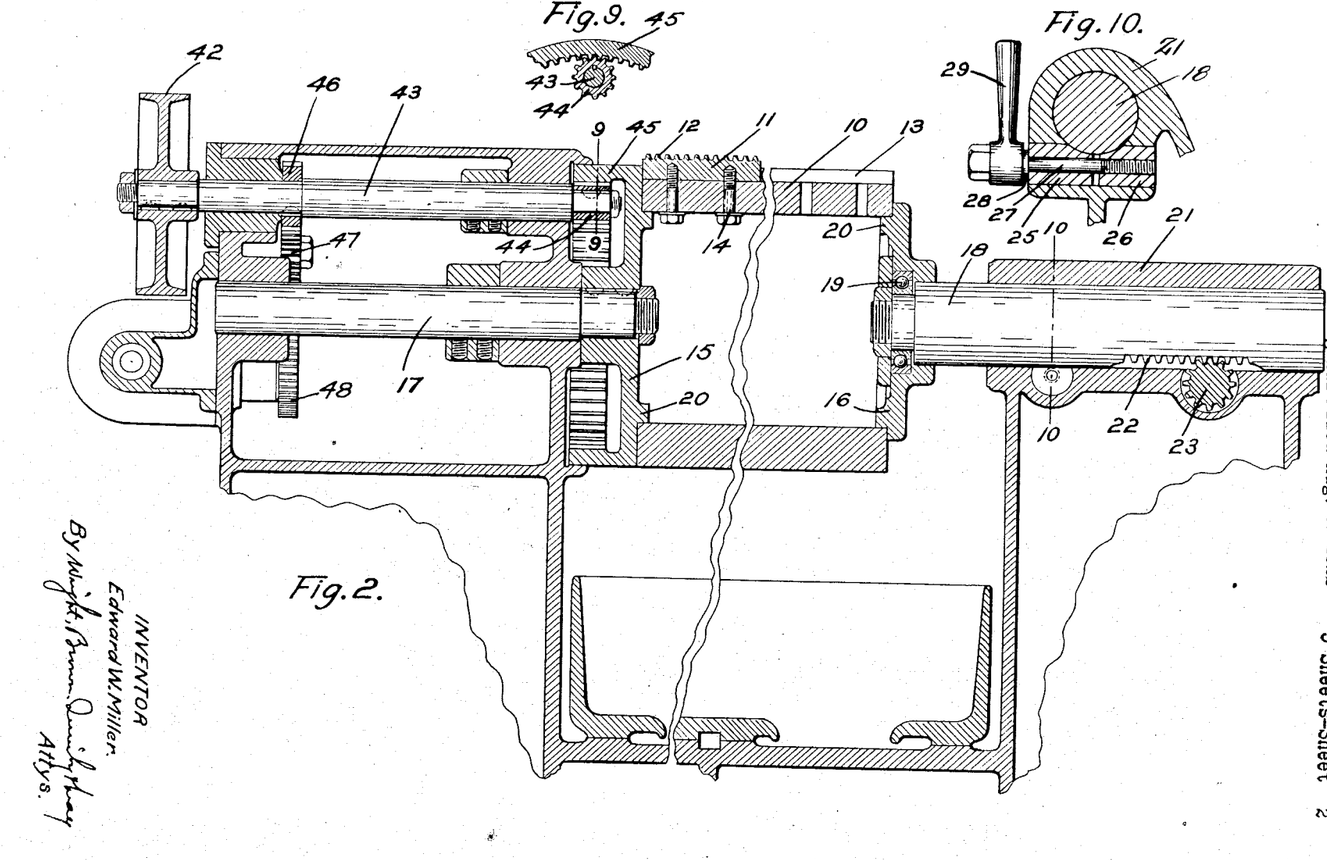
Figure 2 is a central vertical section of the machine.
Figure 9 is a detail section taken on line 9—9 of Figure 2.
Figure 10 is a cross section on line 10—10 of Figure 2.

The cutter head is made, in order to reduce its weight and permit the holding screws to be arranged as shown, as a hollow cylinder of a material and construction having sufficient strength and rigidity. Cast iron is one suitable material for the purpose. This cylinder is supported for rotation by and between face plates 15 and 16, the former of which is made fast by keys to a live or driving spindle and the other is rotatably mounted on a relatively stationary or dead spindle 18, preferably by anti-friction bearings 19. Both plates have centering ribs 20 to enter the opposite ends of the cylindrical cutter head and hold it centrally with respect to the axis of rotation. Thus the part which needs to be removed from the machine when the cutters are to be sharpened is stripped of all weight possible to be eliminated. Withdrawal of the dead spindle 18 from the live spindle, in order to release the cutter head, is made possible by mounting the dead spindle in a sleeve 21 with ability for movement endwise, and for giving such movement to the spindle I have provided it with a series of teeth 22 on one side meshing with a pinion 23, the shaft of which extends toward the front of the machine and carries a hand wheel 24. Adjustments of this spindle are maintained by means of a clamp which consists of two blocks 25 and 26 in line with one another and formed with concave surfaces, complemental to the curvature of the spindle, on their upper sides at their adjacent ends, which surfaces bear on the under side of the spindle. An operating shaft 27 is threaded into the block 26 and has a shoulder 28 bearing on the block 25, such shaft being turned by a handle 29 to crowd the blocks against the spindle (see Figure 10).

The work piece, a gear blank, (shown at 30 in Figures 1, 3 and 8) is carried by a work spindle 31 which is mounted rotatably in proper bearings in a carriage 32. This carriage rests on the machine base and is movable thereon in a path, established by guides 33 and 34, which is parallel to the axis of the cutter. Such movement is given to the carriage, and at the same time the spindle is rotated, by mechanism consisting of a normally stationary master rack 35, a master gear 36 fast on the spindle 31, a worm wheel 37 fast on the same spindle, and a driving worm 38 in mesh with the wheel. If the master gear 36 has the same pitch diameter as the gear to be cut, and the master rack is conjugate to it, and if further the rack and carriage are in position to mesh correctly together, then the resultant motion given to the work piece by the rotation of the spindle and the translation of the carriage, is a rolling motion relative to the cutter teeth, the same as that of a gear conjugate to the rack-formed cutting edges of such teeth rolling in mesh therewith. It results, then, as the work piece so rolls along the cutter while the cutter is revolving about its own axis, that the notches or spaces formed in the work by the cutter are conjugate to the cutter teeth, and the intermediate stock of the work is formed into gear teeth.

Further describing the relation of the work piece, the cutter, and the master rack and master gear to each other, the work piece is preferably so held that its middle transverse plane is radial to the cutter head. Such plane is indicated at e—f in Fig. 3. This arrangement gives the result that any error which may occur, due to the fact that the cutter teeth travel in an arc and not in straight lines parallel to the axis of the work piece, is reduced to the minimum and is equally distributed on each side of the middle plane. Also the pitch line of the cutter teeth in the above named plane, the pitch line of the master rack, and the path of travel of the carriage, are all parallel.

In order to cut to the required depth in the work piece, the carriage and master rack are adjustable in unison toward and away from the cutter. Such adjustment is made possible by mounting the master rack and the carriage guideways 33 and 34 on a cross-feed slide 39 which is arranged and guided to move transversely on the base of the machine; and is so moved by a rotatable cross feed screw 40 which is restrained from endwise movement and engages a threaded lug 41 of the slide.

For cutting larger or smaller gears, the master rack 35 and master gear 36 can be removed and other rack and gear couples of appropriate characteristics substituted. The cross feed just described allows for a substitution of this character to take care of different diameters of gear, without any change in the cutter, but when it is required to cut gears of different pitches, the cutter elements 11 must be replaced by others having teeth of the same pitch as the pitch of the gear to be cut.

Motion for driving the cutter and the work controlling worm 38 simultaneously is derived from a belt pulley 42 (which is typical of any power receiving element) on a shaft 43 which carries a pinion 44 meshing with an internal gear 45 connected integrally or otherwise with the cutter holding plate 15. The same shaft 43 carries a gear 46 which drives the worm 38 through the following train:—idle gear 47 (Figures 2 and 4), gear 48 (Figures 2 and 5), shaft 49, miter gears 50 and 51, shaft 52, gear 53 (Figures 4 and 5) idler 54, gear 55 (Figures 1 and 4), shaft 56, bevel gear 57, alternate gears 58 or 59, clutch 60 and shaft 61 on which the worm 39 is splined in order to travel with the carriage and remain always in mesh with the worm wheel 37. The shafts 49, 52 and 61 are suitably mounted in the frame and the gears respectively associated with them (except gears 58 and 59) are keyed to them and suitably encased, all as shown in the drawings with sufficient clearness to teach those skilled in the art how to make and use the invention.

The gears 58 and 59 are loose on their shaft 61 and are adapted to be coupled alternately to the shaft. They are arranged on opposite sides of the gear 57, with which both are in mesh constantly, so that they travel in opposite directions. The clutch 60 is splined on the shaft and has clutch teeth on its opposite ends adapted to engage complemental teeth on adjacent ends of the gears 58 and 59. It is moved into coupled engagement with one or the other of the gears by a clutch shifter 62 having arms straddling the clutch and studs 63 entering an external groove 64 in the clutch. This shifter is carried by a shaft 65 (Figures 4 and 6) which carries two operating arms 66 and 67, the former having a handle for manipulation by the operator and the latter being arranged for automatic operation to stop the machine.

The automatically operated arm 67 projects under a rod 68 which is secured to a lug 69 on the cutter carriage (Figure 7), and the rod carries studs 70 and 71 on opposite sides of the arm, whereby, at the end of travel of the carriage in either direction, one or the other of these studs strikes the arm and moves the clutch into neutral position. It is to be understood, of course, that the lead of the worm 38 and the rotational directions of the several parts of the train are such that in order to drive the carriage from left to right the arm 67 is put in the left hand position, and to drive it from right to left the arm is put in the right hand position. The placement of the clutch and arm 67 in each position is effected manually by the handle 66, but the uncoupling of the clutch is accomplished automatically by the carriage at the end of its travel.

Figure 1:
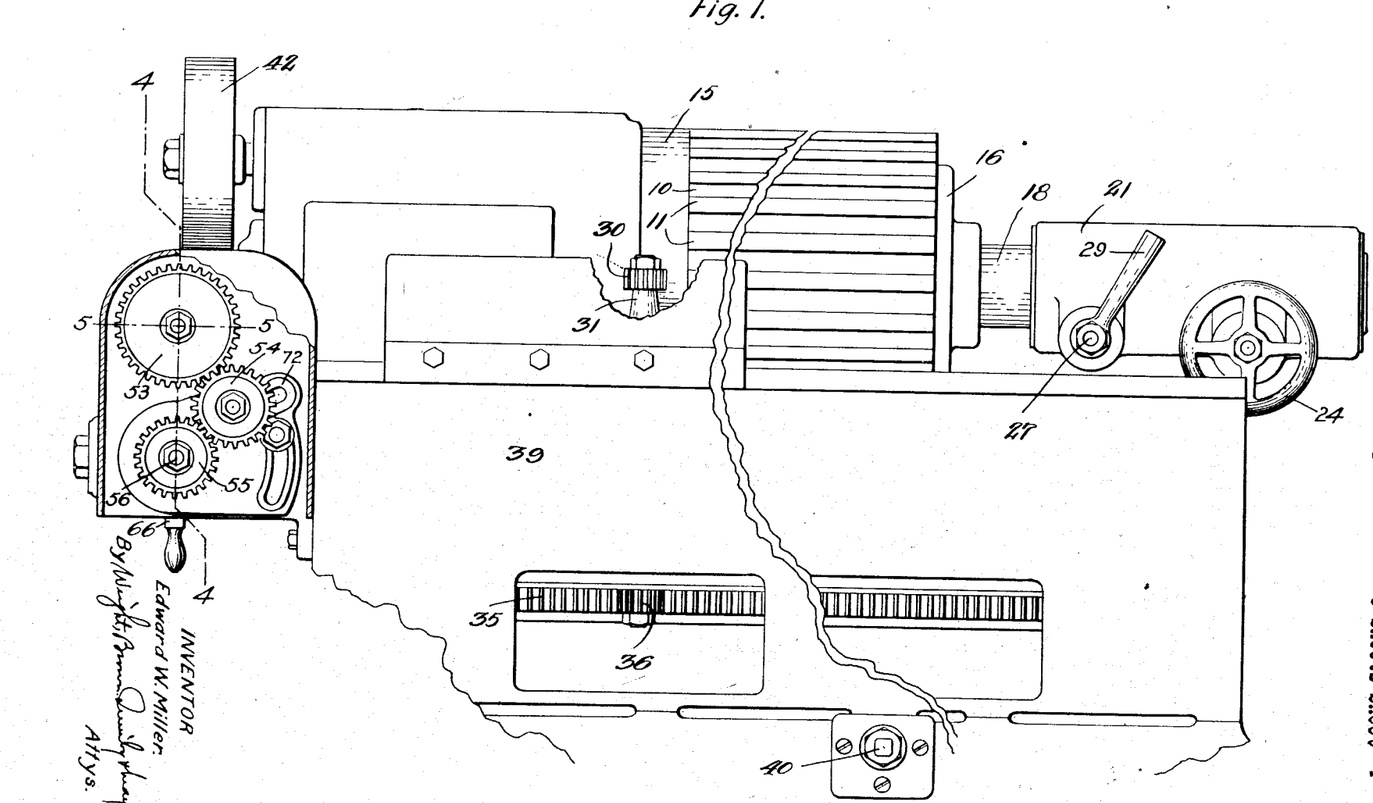
Figure 1 is a front elevation of the machine referred to, partly broken away and condensed in length.

The gears 53 and 55 of the before described train are change gears, and gear 54 is an idler mounted on a carrier 72 which is adapted to swing about the axis of shaft 56, the stud on which the gear 54 is mounted being adjustable toward and away from said shaft, as is clearly indicated by Figure 1.

The manner in which the machine operates has already been largely explained in connection with the description of the machine. It is sufficient merely to add that the machine may be started by setting the pulley 42 in motion, with the effect of setting the cutter in rotation and driving the work feeding train as far as shaft 61, provided the clutch 60 is in neutral position at that time. Assuming that the work carriage is at one end of its travel and that the cross feed slide is appropriately adjusted for depth of cut, then by shifting the clutch to right or left, as the case may be, the work spindle is set in rotation and at the same time the carriage is set in motion by rolling of the pinion 36 over the rack 35. It may be noted here that under the conditions assumed, movement of the starting lever 66 is possible in one direction only, because the stud 70 or 71 prevents movement of the clutch into the position which would cause further movement of the carriage in the same direction as that traveled before it reached its stopping place.

Now, as the carriage travels, the work piece rolls along the exterior of the cutter, and the cutting teeth, following one another in rapid succession, cut away the stock of the work piece until, at the end of the travel, the work piece has been transformed into a roughed out gear wheel with teeth cut to the predetermined depth. When the work has passed beyond the end of the cutter, the clutch is automatically disconnected. A second pass of the work along the cutter may be effected if it is desired to take a finishing cut on this machine, but if not a new blank may be substituted for that just cut before the carriage is set in motion again. In any event the gear may be cut fully to any predetermined depth in one passage.

Figures 4, 5, 6, 7, 8:
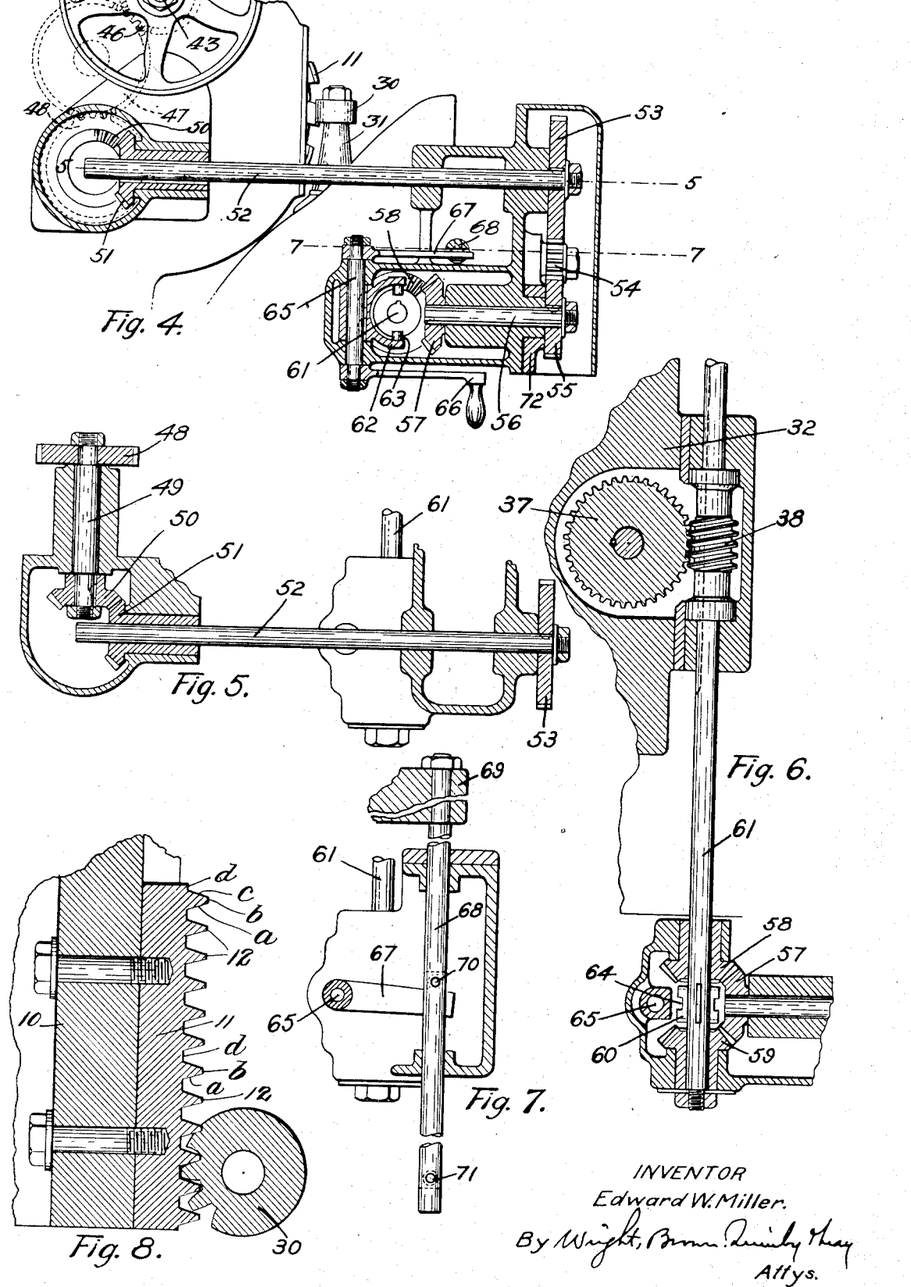
Figure 4 is a vertical section showing a detail of operating mechanism, the section being taken on line 4—4 of Figure 1.
Figure 5 is a horizontal section of part of the mechanism taken on line 5—5 of Figures 1 and 4.
Figure 6 is a horizontal section showing that part of the driving mechanism which gives rolling motion to the work, the plane of section being indicated by line 6—6 of Figure 3.
Figure 7 is a horizontal section taken on line 7—7 of Figure 4, showing the automatic stopping means.
Figure 8 is a horizontal sectional view illustrating the gear generating operation carried out by the machine.

I have referred previously to a variance between the middle part and the ends of the teeth cut in this machine, due to the orbital movement of the cutter teeth. This variance is due to the fact that the profile of the orbits or paths traversed by the cutting edges has the true desired rack profile only in planes radial to the cutter heads, while the truth and accuracy of gear teeth are tested with reference to the intersections of planes perpendicular to the axis of the gear. But there is only one plane which is both radial to the cutter and perpendicular to the gear axis. The line e—f in Fig. 8 indicates that plane. In the case of the involute system of gearing for example, (the one chosen for illustration herein, and particularly in Figure 8 of these drawings) the base rack has teeth with straight sides. When a cutter in the form of such a base rack as that shown in Figure 8 is revolved about an axis parallel to its pitch line, the inclined sides of its teeth, or in other words the lateral cutting edges indicated by the letters a and c, generate imaginary surfaces of revolution which are frusta of cones. Such surfaces of revolution are the orbits of these cutting edges. The intersections of said conical surfaces or orbits with planes radial to the cutter head have the true outline of the base rack, and that part of the tooth being cut in the work which is intersected by the radial plane e—f perpendicular to the gear axis is generated with the true involute form. But all other planes parallel to plane e—f are parallel to the cutter axis and their intersections with the said conical orbits are hyperbolic curves. The parts of the gear teeth lying in these parallel planes are then generated conjugate to such hyperbolic curves and are therefore distorted more or less from the true involute form. Such distortion is relatively small in the case of a short gear and a cutter head of large radius. But the distortion or error from this cause, however slight, may be avoided entirely by giving the cutter teeth the form of rack teeth of zero pressure angle so-called, that is, teeth of which the lateral faces or edges corresponding to a and c are perpendicular to the pitch line of the rack. The cutting edges then are perpendicular to the axis of the cutter, and if the work piece is driven at the same time at a rate which gives a rolling motion, equivalent to rolling on a previously established base circle, then the teeth may be generated of uniform width and face curvature from end to end; and a machine so built may be applied for producing accurate finished gears. Then the orbits of said lateral cutting teeth are planes perpendicular to the axis of the cutter and the intersections therewith of all planes perpendicular to said axis have the same outline. I mention this fact to show that the machine is applicable, by the use of suitable cutting elements, to either the purpose of roughing out approximately correct generated gears ready for an accurate finishing operation, or to producing accurate finished gears in the first instance.

Figure 11:
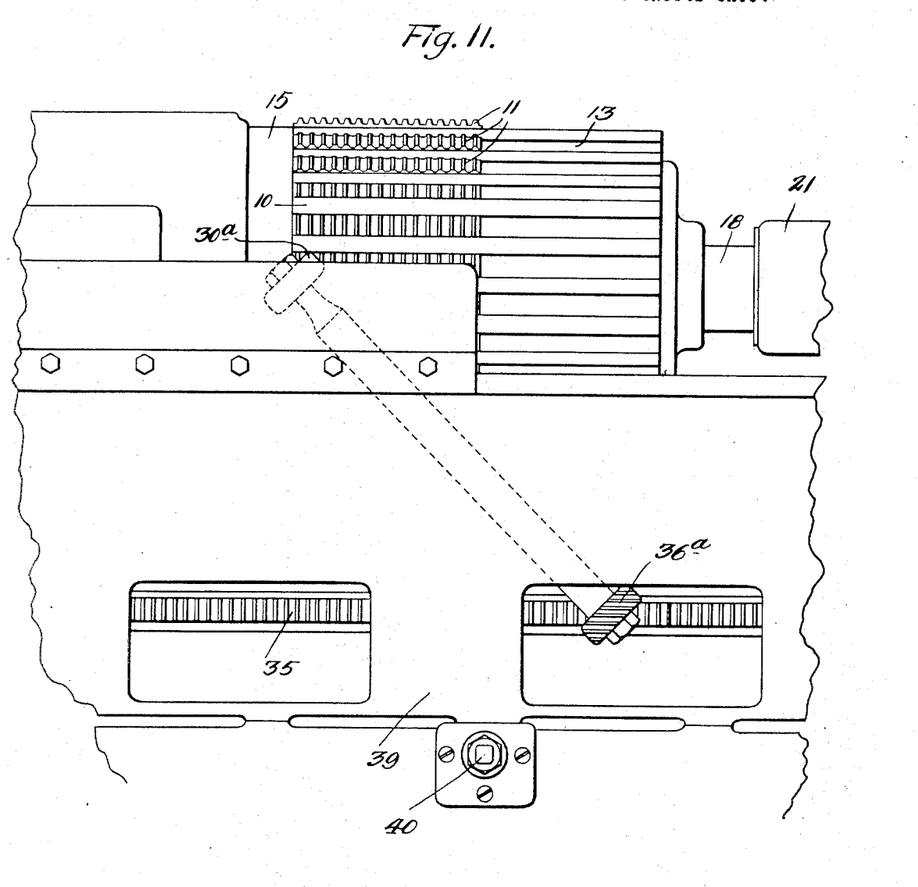
Figure 11 is an elevation of the machine as modified to cut helical gears.

As hereinbefore described, the machine is designed to produce straight spur gears. It may, however, be modified to cut helical gears is well, and the modification for this purpose consists, essentially, simply in arranging the work spindle at an inclination equal to the helix angle desired of the teeth to be cut, in the proper direction, and providing as the master gear, a gear of the same helix angle and direction. The driving worm wheel is also correspondingly a helical gear. The machine arranged or modified as thus described is shown in Figure 11, wherein the work piece is designated 30$^a$, the master gear 36$^a$, and the other parts are substantially the same as first described.

Figure 3:
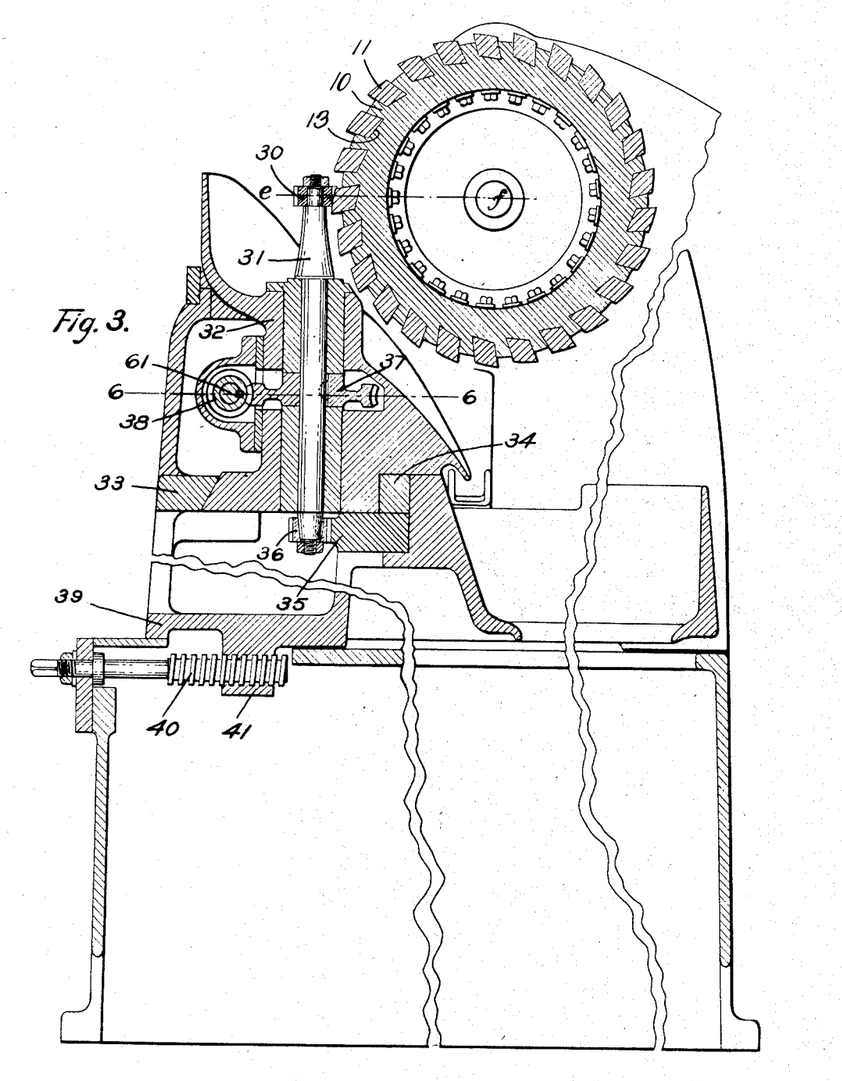
Figure 3 is a cross section of the machine taken through the work holding spindle and representing the work in operative relation to the cutter.

In either case, whether cutting a straight spur gear or a helical gear, the gear being cut is placed so that it crosses a plane radial to the cutter head, as the plane e—f of Fig. 3, and is moved with combined movements of translation and rotation in the manner of a gear rolling in mesh with a rack of which the pitch line lies in such plane and is parallel to the cutter head axis.

It will be obvious to those skilled in the art that various modifications in construction of the different elements of the machine and in their arrangement to one another may be made without departure from the essential principles of the invention herein described, and within the scope of the protection afforded by the following claims.

What I claim and desire to secure by Letters Patent is:

1. A gear generating machine comprising a rotatable cutter head of a diameter many times greater than the thickness of the gear to be cut, a series of separate cutting elements mounted on said head parallel to the axis thereof and having cutting edges arranged in the outlines of rack teeth, all equidistant from the axis of the cutter and spaced longitudinally thereof equally to the tooth spacing of a rack conjugate to the gear to be cut, a work carriage movable parallel to the axis of the cutter, a work spindle rotatably mounted in the carriage, a stationary rack parallel to the cutter axis, a gear on the spindle in mesh with said rack, and mechanism for applying rotary motion to the spindle.

2. In a gear generating machine, means for supporting and imparting a rolling motion to a work piece comprising a linearly movable carriage, a work spindle rotatably mounted on the carriage, a stationary rack parallel to the direction of travel of the carriage, a pinion on the spindle meshing with the rack, a worm wheel on the spindle, a worm meshing with said wheel and constrained to travel with the carriage, and a drive shaft to which the worm is splined and by which it is rotated.

3. A gear generating machine comprising a cylindrical cutter head rotatable about its geometric axis and having a plurality of cutting bars mounted peripherally, each of said units having its cutting edges in the outline of a rack the pitch line of which is parallel to the axis of the cutter head, a work carriage, means for supporting a gear blank across a plane radial to the cutter axis, and means for rolling such gear blank on the position of the pitch line of the cutters in said radial plane.

4. A gear generating machine comprising a rotatably mounted cutter head having teeth equally distant from its axis and arranged in zones perpendicular to and equally spaced along said axis, the cutting edges of said teeth traveling in orbits the profiles of which collectively conform substantially to the outlines of a rack, and the diameter of the cutter head being so great that said orbits approximately coincide with straight lines throughout the axial length of the gear to be cut, a work carriage movable parallel to the axis of said cutter head, a work holding spindle rotatably mounted on said carriage, a cross feed slide movable toward and away from the axis of the cutter head and on which said carriage is movable parallel to said axis, a rack mounted on said cross feed slide in a fixed position relatively to said carriage and parallel to said cutter head axis, a pinion secured to said work-holding spindle and in mesh with said rack, and means for imparting rotation to the spindle.

5. In a gear generating machine of the character set forth, a cutter head comprising a hollow cylinder and cutters formed as bars detachably secured to the head and having alternate projections and notches, with cutting edges in the same profile as a rack.

6. A gear generating machine comprising in combination with a work-holding carriage movable in a given path, a work-spindle rotatably held by the carriage and means for causing simultaneous rotation of the spindle and linear displacement of the carriage, of a cutter head comprising a hollow cylinder having provisions for mounting a plurality of detachable cutters in its outer circumference, means for supporting said cutter head, comprising alined but separated spindles and face plates mounted on said spindles and having provision for engaging and centering opposite ends of the cutter head, and mechanism for rotating one of said spindles.

7. A gear generating machine as set forth in claim 6, in which one of said spindles is non-rotating and the face plate mounted thereon is rotatably mounted.

8. A gear generating machine as set forth in claim 6, in which one of the spindles is movable endwise toward and away from the other whereby to permit placement and clamping of the cutter head between said face plates and to permit removal of the head from between the face plates.

9. A gear generating machine comprising a work carriage arranged to travel in a given straight line, a work spindle rotatably mounted in the carriage, complemental gear elements arranged to cause linear movement of the carriage when the spindle is rotated, a driven gear element secured to the spindle, a driving gear element in mesh with said driven element and arranged to travel with the carriage, a shaft on which said driving element is splined, oppositely rotating driving members loose on said shaft, a clutch splined to the shaft between said members and constructed with provision for coupling one of said elements to the shaft and uncoupling the other when moved alternately in opposite directions, and a clutch shifter arranged for operation by the carriage in its movement.

10. In a gear generating machine, a work carriage, a rotatable spindle in the carriage, a driving shaft, intermeshing gear elements on said shaft and spindle for rotating the latter, means by which rotation of the spindle causes translation of the carriage, oppositely rotating driving members loosely mounted on said shaft, a clutch splined to the shaft between said members constructed and arranged to be put into mesh alternately with each, and a clutch shifter including an arm arranged in the path of said carriage and adapted to be moved by the latter for moving the clutch from one of said driving members toward the other.

11. A gear generating machine comprising the combination of a rotatable cutter head and a work carriage in operative association with each other, the cutter head having a multiplicity of cutters arranged to follow one another during the rotation of the cutter head in paths of which the profiles collectively form the outline of an operative series of gear teeth, means for moving said carriage lengthwise of the cutter head, and means for simultaneously rotating the work held by the carriage at the same rate as that of a gear element rolling in mesh with a series of teeth corresponding to such profiles.

12. A gear generating machine comprising the combination of a rotatable cutter head and a work carriage in operative association with each other, the cutter head having a multiplicity of cutters arranged to follow one another during the rotation of the cutter head in paths of which the profiles collectively form the outline of an operative series of gear teeth, such paths being approximately straight in a length equal to the axial length of the gear to be cut, means for moving said carriage lengthwise of the cutter head, a stationary series of gear teeth arranged beside such path and being similar in characteristics, spacing and arrangement to the series of cutter teeth, and a gear element fixed to said work holder and meshing with said stationary series of teeth.

In testimony whereof I have affixed my signature.

EDWARD W. MILLER.